US005729391A

United States Patent [19]
Ito

[11] Patent Number: 5,729,391
[45] Date of Patent: Mar. 17, 1998

[54] MICROSCOPE OBJECTIVE LENS

[75] Inventor: Itoe Ito, Kawasaki, Japan

[73] Assignee: Nikon Corporation, Tokyo, Japan

[21] Appl. No.: 792,539

[22] Filed: Jan. 31, 1997

[30] Foreign Application Priority Data

Feb. 15, 1996 [JP] Japan ................................ 8-052439

[51] Int. Cl.$^6$ ........................ G02B 21/02; G02B 9/12
[52] U.S. Cl. ..................... 359/661; 359/656; 359/792
[58] Field of Search ............................ 359/362, 642, 359/656, 658, 660, 754, 755, 784, 787, 788, 791–792, 355–357

[56] References Cited

U.S. PATENT DOCUMENTS

| | | | |
|---|---|---|---|
| 4,184,747 | 1/1980 | Uetake | 359/659 |
| 5,216,545 | 6/1993 | Saito | 359/661 |
| 5,469,299 | 11/1995 | Nagano | 359/661 |
| 5,532,878 | 7/1996 | Suenaga et al. | 359/660 |

FOREIGN PATENT DOCUMENTS 5-119264A  5/1993  Japan .

*Primary Examiner*—Thong Nguyen
*Attorney, Agent, or Firm*—Klarquist Sparkman Campbell Leigh & Whinston, LLP

[57] ABSTRACT

A plan apochromatic microscope objective lens is disclosed having few constituent lens elements, a large numerical aperture, excellent flatness across the entire field of view of the objective lens, and a relatively long working distance. The objective lens comprises, in order from the object side, first, second, and third lens groups. The first lens group comprises a meniscus lens having a concave surface oriented toward the object side, and a positive meniscus lens having a concave surface oriented toward the object side. The second lens group comprises a simple lens, a cemented lens including a negative lens and a positive lens, and a cemented lens including a positive lens and two negative lenses. The third lens group comprises a cemented lens with overall weak refractive power and including a positive lens and a negative lens. The objective lens satisfies a number of conditional expressions.

2 Claims, 3 Drawing Sheets

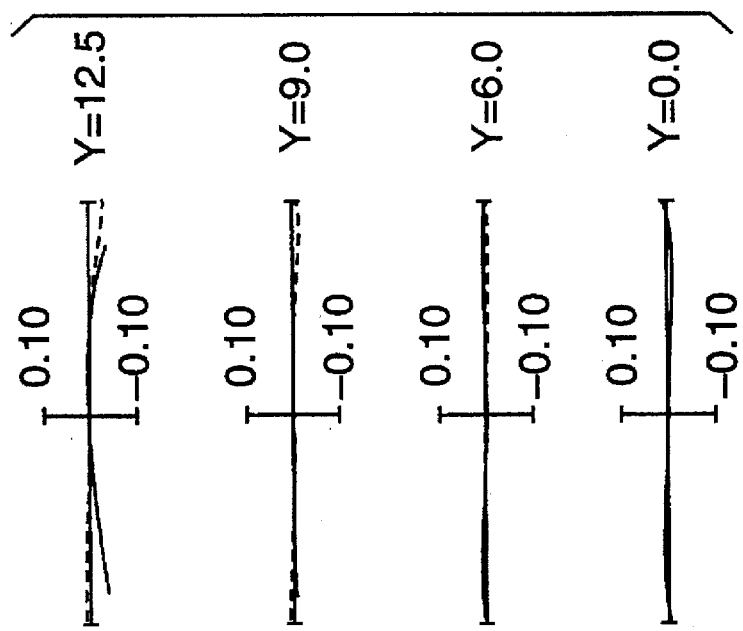
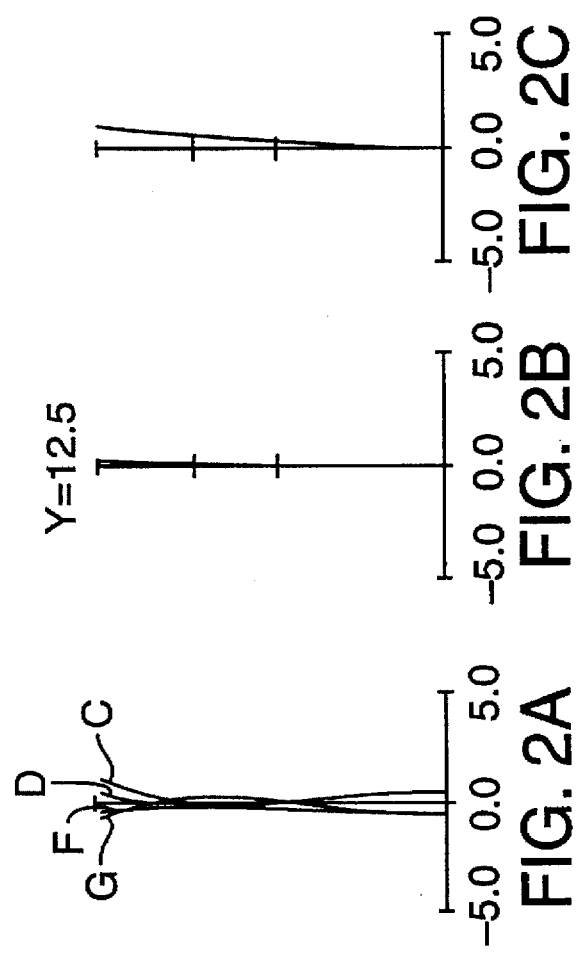
FIG. 2A  FIG. 2B  FIG. 2C  FIG. 2D

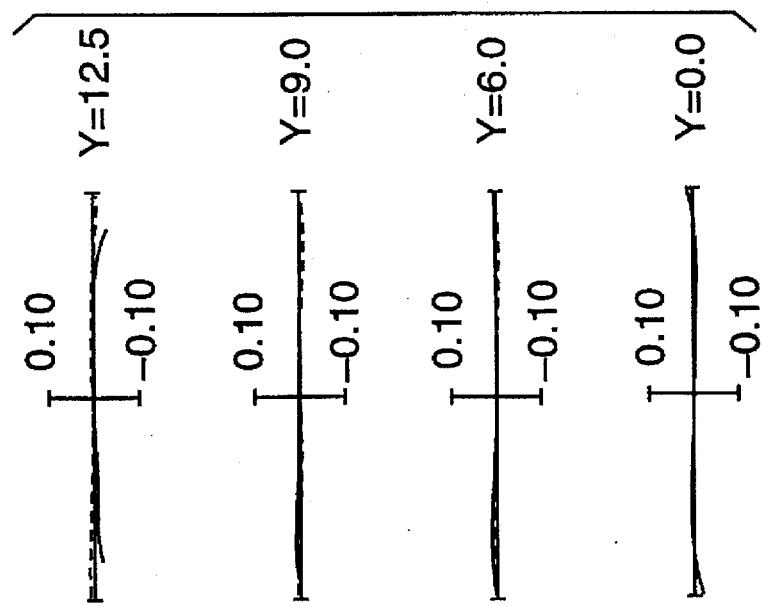
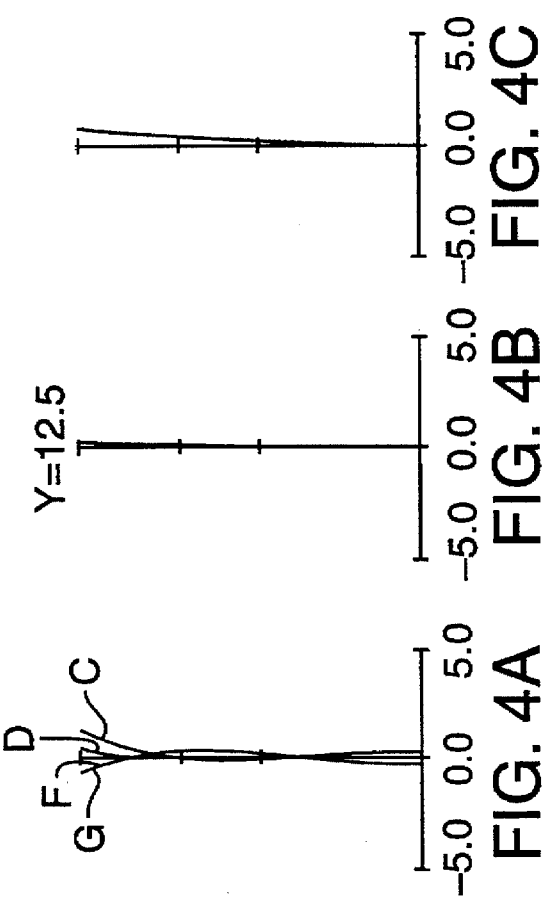
FIG. 4D
FIG. 4C
FIG. 4B
FIG. 4A

MICROSCOPE OBJECTIVE LENS

FIELD OF THE INVENTION

This invention pertains to microscope objective lenses. More specifically, the invention pertains to infinity-correcting, plan apochromatic microscope objective lenses that effectively correct chromatic aberration, have good image-plane flatness, and exhibit relatively long working distances.

BACKGROUND OF THE INVENTION

Reference is made to the microscope objective lens disclosed in Japanese Kôkai Patent Document No. HEI 5-119264. That microscope objective lens exhibits a 20× magnification and a numerical aperture (NA) of 0.7. It comprises a first lens group with positive refractive power, a second lens group with negative refractive power, a third lens group with positive refractive power, a fourth lens group with negative refractive power, and a fifth lens group with a weak refractive power. The first lens group comprises a meniscus lens element having a concave surface oriented toward the object side. The most imagewise surface of the first lens group is convex and oriented toward the image plane. The second lens group diverges the light flux propagating from the first lens group. The third lens group converges the light flux from the second lens group. The fourth lens group has a meniscus configuration with a convex surface oriented toward the object side. The fifth lens group also has a meniscus configuration with a concave surface oriented toward the object side.

Used as a "dry" objective, the microscope objective lens disclosed in the reference discussed above forms, to a certain extent, a flat image plane. However, the objective lens disclosed in that reference comprises a large number of constituent lens elements, and does not correct coma as well as would be desired.

SUMMARY OF THE INVENTION

The present invention cures the deficiencies of the prior-art microscope objective lenses summarized above. Hence, an object of the invention is to provide an apochromatic microscope objective lens comprising a relatively small number of lens elements, exhibiting a magnification of approximately 20×, having a large numerical aperture, having an ability to effectively correct chromatic aberrations, having excellent image-plane flatness across the entire field of view, and having a relatively long working distance.

According to a preferred embodiment, the microscope objective lens comprises, on an optical axis in order from the object side, a first lens group G1, a second lens group G2, and a third lens group G3. The first lens group G1 comprises a meniscus lens L11 having a concave surface oriented toward the object side, and a positive meniscus lens L12 having a concave surface oriented toward the object side. The second lens group G2 comprises a simple lens L21, a cemented lens L22 including a negative lens cemented to a positive lens, and a cemented lens L23 including a positive lens cemented to two negative lenses. The third lens group G3 comprises a cemented lens L31 having an overall weak refractive power and including a positive lens cemented to a negative lens. The objective lens preferably satisfies the conditions:

$|F/f11|+|F/f3|<0.1$ $3<f2/F<5$ $|F/r7|<0.7$ wherein F is the overall focal length of the objective lens, f11 is the focal length of the meniscus lens L11 in the first lens group G1, f2 is the focal length of the second lens group G2, f3 is the focal length of the third lens group G3, and r7 is the curvature radius of the imagewise surface of the cemented lens L22 in the second lens group G2.

Even more preferably, in a microscope objective lens of this invention, the cemented lens L23 in the second lens group G2 comprises, in order from the object side, a negative lens L2a cemented to a positive lens L2b which is cemented to a negative lens L2c. Such an objective lens preferably further satisfies the conditions:

$0.1<n_{2a}-n_{2b}$ $0.08<n_{2c}-n_{2b}$ wherein $n_{2a}$ is the refractive index (relative to d-line) of the negative lens L2a, $n_{2b}$ is the refractive index (relative to d-line) of the positive lens L2b, and $n_{2c}$ is the refractive index (relative to d-line) of the negative lens L2c.

The foregoing and additional features and advantages of the invention will be more readily apparent from the following detailed description, which proceeds with reference to the accompanying drawings.

BRIEF DESCRIPTION OF THE DRAWINGS

FIGS. 2A–2D provide plots of spherical aberration, astigmatism, distortion, and coma, respectively, as exhibited by Example Embodiment 1.

FIGS. 4A–4D provide plots of spherical aberration, astigmatism, distortion, and coma, respectively, as exhibited by Example Embodiment 2.

DETAILED DESCRIPTION

Figure 1:
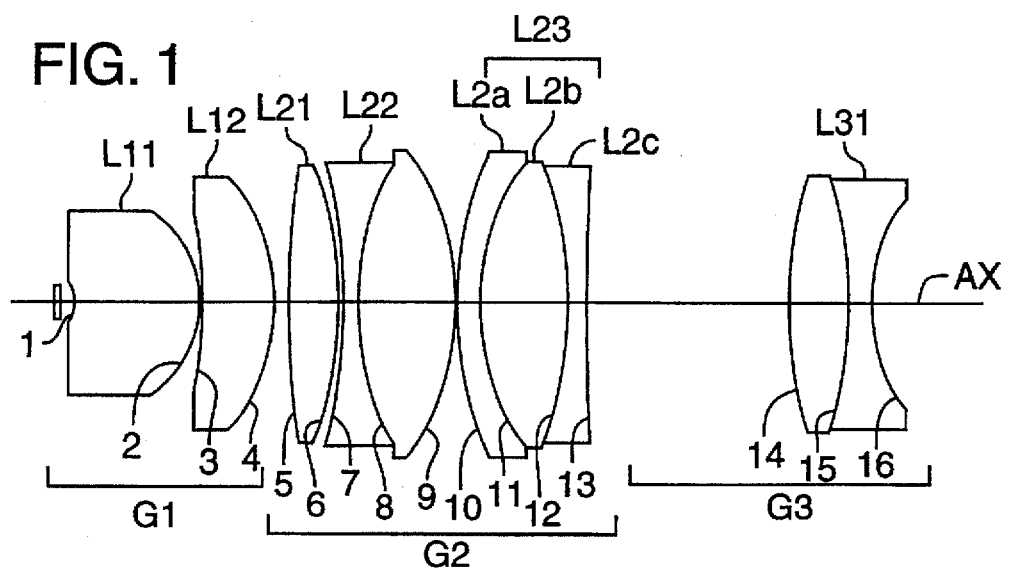
FIG. 1 is an optical diagram showing general features of a microscope objective lens according to the present invention as well as specific features of Example Embodiment 1.

A preferred embodiment of a microscope objective lens according to this invention comprises, in order from the object side, a first lens group G1, a second lens group G2, and a third lens group G3, as shown generally, for example, in FIG. 1. The first lens group G1 comprises a meniscus lens L11 having a concave surface oriented toward the object side (left side in the figure), and a positive meniscus lens L12 having a concave surface oriented toward the object side. The second lens group G2 comprises a biconnect lens L21 a cemented lens L22 including a negative lens cemented to a positive lens, and a cemented lens L23 including a positive lens cemented to two negative lenses. The third lens group G3 comprises a cemented lens L31 with a weak refractive power and including a positive lens cemented to a negative lens.

Microscope objective lenses according to the invention also satisfy the following Conditional Expressions (1)–(3):

$|F/f11|+|F/f3|<0.1$     (1)

$3<f2/F<$     (2)

$|F/r7|<0.7$     (3)

wherein F is the overall focal length of the objective lens, f11 is the focal length of the meniscus lens L11 in the first lens group G1, f2 is the focal length of the second lens group G2, f3 is the focal length of the third lens group G3, and r7 is the curvature radius of the imagewise surface of the cemented lens L22 in the second lens group G2.

Conditional Expression (1) establishes a suitable range for the refractive power of the meniscus lens L11 in the first lens group G1 and the refractive power of the third lens group G3. Exceeding the stated maximum value of Conditional Expression (1) causes the refractive power of the meniscus lens L11 in the first lens group G1 or the refractive power of the third lens group G3 to be too large, making aberration-correction difficult.

Conditional Expression (2) establishes a suitable range for the refractive power of the second lens group G2. Since the rays that have passed through the first lens group G1 are highly divergent, it is difficult to correct coma when the value of Conditional Expression (2) is less than the stated minimum value. Correction of spherical aberration is difficult if the maximum value in Conditional Expression (2) is exceeded.

Conditional Expression (3) is a condition for canceling out any positive spherical aberration imparted by the lens group situated on the image side of the cemented lens L22 by making the spherical aberration negative at the imagewise surface of the cemented lens L22. Exceeding the stated maximum value of Conditional Expression (3) renders it impossible to make the spherical aberration negative at the imagewise surface of the cemented lens L22, thereby leaving unwanted positive spherical aberration in the overall objective lens.

In order to obtain even better imaging performance with an objective lens according to this invention, the cemented lens L23 in the second lens group G2 is preferably made by cementing together, in order from the object side, a negative lens L2a, a positive lens L2b, and a negative lens L2c. It is also preferable that the following Conditional Expressions be satisfied:

$$0.1 < n_{2a} - n_{2b} \quad (4)$$

$$0.08 < n_{2c} - n_{2b} \quad (5)$$

wherein $n_{2a}$ is the refractive index (relative to the d-line) of the negative lens L2a, $n_{2b}$ is the refractive index (relative to the D-line) of the positive lens L2b, and $n_{2c}$ is the refractive index (relative to the D-line) of the negative lens L2c.

Conditional Expressions (4) and (5) establish suitable ranges for the difference in refractive indices of the adjacent lenses in the cemented lens L23 to accommodate a high order of chromatic-aberration correction. Falling below the minimum values of Conditional Expressions (4) and (5) renders it impossible to achieve good correction of chromatic aberration.

EXAMPLE EMBODIMENTS

Example embodiments of this invention are explained below, based on the attached figures. The example embodiments represent the current best mode of the invention.

In each example embodiment, the subject microscope objective lens comprises, in order from the object side, a first lens group G1 comprising a meniscus lens L11 having a concave surface oriented toward the object side, and a positive meniscus lens L12 having a concave surface oriented toward the object side; a second lens group G2 comprising a simple lens L21, a cemented lens L22 including a negative lens cemented to a positive lens, and a cemented lens L23 including one positive lens and two negative lenses; and a third lens group G3 comprising a cemented lens L31 having an overall weak refractive power and comprising a positive lens cemented to a negative lens.

In each example embodiment, an imaging lens was employed to obtain certain data in the respective tables. The imaging lens was situated imagewise of the microscope objective lens and separated from the microscope objective lens by an axial distance of 150 mm. The combination of the microscope objective lens with the imaging lens represented a finite optical system.

The various aberration plots (FIGS. 2 and 4) provided for each Example Embodiment were generated with the axial distance from the microscope objective lens and the imaging lens set at 150 mm. However, it was discovered in testing that there is virtually no change in aberration as long as the axial distance from the microscope objective lens and the imaging lens is between 100 mm and 200 mm.

Figure 5:
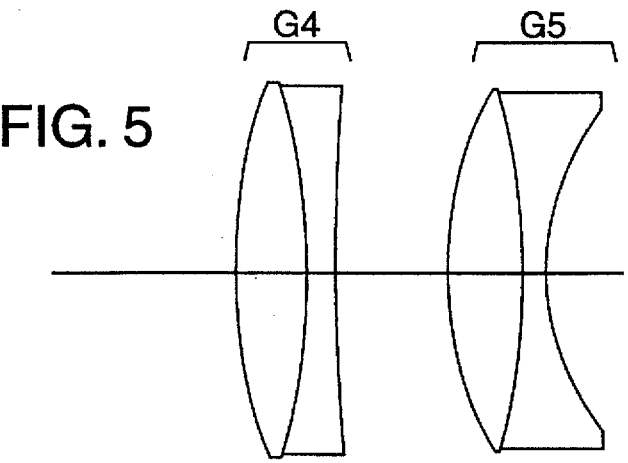
FIG. 5 is an optical diagram of an imaging lens used to obtain data on each of Example Embodiments 1 and 2.

FIG. 5 shows the optical structure of the imaging lens used to obtain data in each Example Embodiment. The imaging lens comprises, in order from the object side, a first cemented positive lens G4 including a biconvex lens and a biconcave lens, and a second cemented positive lens G5 including a biconvex lens and a biconcave lens.

Data pertaining to the imaging lens of FIG. 5 are provided in Table 1, below. In Table 1, the first (leftmost) column pertains to lens surface numbers, beginning on the object side, the column labeled "r" pertains to the curvature radius of each lens surface, the column labeled "d" pertains to the axial distance between adjacent lens surfaces, and the columns labeled "n" and "v" pertain to the refractive index and the Abbe number, respectively, of the corresponding lens (relative to the D-line; λ=587.6 nm).

TABLE 1

| Surface No. | r (mm) | d (mm) | v | n |
|---|---|---|---|---|
| 1 | 75.0430 | 5.1000 | 57.03 | 1.62280 |
| 2 | −75.0430 | 2.0000 | 35.19 | 1.74950 |
| 3 | 1600.5800 | 7.5000 | | |
| 4 | 50.2560 | 5.1000 | 41.96 | 1.66755 |
| 5 | −84.5410 | 1.8000 | 44.40 | 1.61265 |
| 6 | 36.9110 | | | |

EXAMPLE EMBODIMENT 1

The objective lens according to this Example Embodiment is shown in FIG. 1. The microscope objective lens of this Example Embodiment comprises, on an optical axis AX in order from the object side, a first lens group G1, a second lens group G2, and a third lens group G3. The first lens group G1 comprises a positive meniscus lens L11 having a concave surface 1 oriented toward the object side and a positive meniscus lens L12 having a concave surface 3 oriented toward the object side. The second lens group G2 comprises a biconvex lens L21; a cemented positive lens L22 including a biconcave lens and a biconvex lens; and a cemented positive lens L23 including a negative meniscus lens L2a having a convex surface 10 oriented toward the object side, a biconvex lens L2b, and a biconcave lens L2c. The third lens group G3 comprises a cemented negative lens L31 including a biconvex lens and a biconcave lens.

Specifications pertaining to Example Embodiment 1 are provided below in Table 2. In Table 2, F denotes the focal length of the microscope objective lens, NA represents the numerical aperture, β represents the magnification exhibited by a combination of the subject microscope objective lens and the imaging lens of FIG. 5, and WD represents the working distance. In addition, the left-hand column provides lens-surface numbers in order from the object side, the second column labeled "r" provides data on the corresponding curvature radius (mm) for each lens surface, the third column labeled "d" provides data on the corresponding axial distance (mm) between adjacent lens surfaces, and the fourth and fifth columns labeled "n" and "ν", respectively, pertain to the refractive index and Abbe number, respectively, (relative to the D-line ($\lambda$=587.6 nm) for each corresponding lens.

TABLE 2

F = 10 mm
NA = 0.75
β = −20.0
WD = 1.4 mm
$f_{11}$ = 3364 mm
$f_2$ = 43 mm
$f_3$ = 333 mm

| Surface No. | r (mm) | d (mm) | ν | n |
|---|---|---|---|---|
| 1 | −4.8011 | 9.2500 | 53.74 | 1.69350 |
| 2 | −8.5714 | 0.1000 | | |
| 3 | −61.9890 | 5.5500 | 82.51 | 1.49782 |
| 4 | −13.8887 | 1.0000 | | |
| 5 | 3.70002 | 3.7000 | 82.51 | 1.49782 |
| 6 | −27.2060 | 0.2000 | | |
| 7 | −42.2000 | 1.2000 | 38.79 | 1.67162 |
| 8 | 20.2705 | 7.4000 | 95.56 | 1.43388 |
| 9 | −20.2705 | 0.2000 | | |
| 10 | 27.8450 | 1.7000 | 44.40 | 1.61265 |
| 11 | 18.0004 | 6.7000 | 95.56 | 1.43388 |
| 12 | −26.4259 | 1.3000 | 44.40 | 1.61265 |
| 13 | 216.0620 | 15.3000 | | |
| 14 | 29.0400 | 4.6000 | 37.90 | 1.72342 |
| 15 | −29.0400 | 1.8000 | 58.90 | 1.51823 |
| 16 | 13.4605 | | | |
| Values of Conditional Expressions | | | | |
| (1) | |F/f11| + |F/f3| | = | 0.03 | |
| (2) | f2/F | = | 4.3 | |
| (3) | |F/r7| | = | 0.5 | |
| (4) | $n_{2a} - n_{2b}$ | = | 0.17877 | |
| (5) | $n_{2c} - n_{2b}$ | = | 0.17877 | |

FIGS. 2A–2D provide aberration plots for this Example Embodiment. In each plot, Y denotes the image height, D denotes the D-line ($\lambda$=587.6 nm), C denotes the C-line ($\lambda$=656.3 nm), F denotes the F-line ($\lambda$=486.1 nm), and G denotes the G-line ($\lambda$=435.6 nm). In FIG. 2B, the solid line indicates the sagittal image plane and the dashed line indicates the meridional image plane.

As is clear from the various aberration plots, all of the aberrations are effectively corrected.

EXAMPLE EMBODIMENT 2

Figure 3:
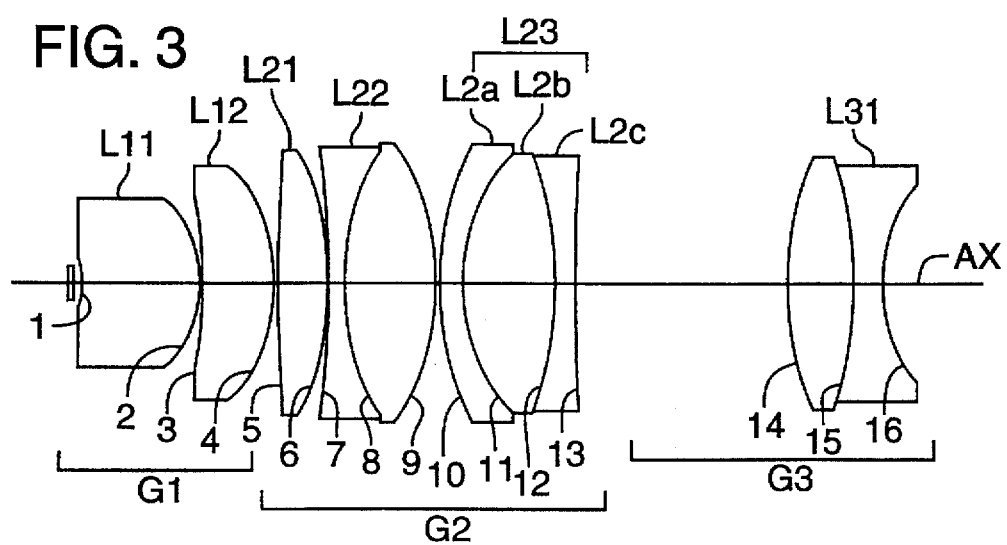
FIG. 3 is an optical diagram showing specific features of Example Embodiment 2.

The objective lens according to this Example Embodiment is shown in FIG. 3. The microscope objective lens of this Example Embodiment comprises, on an optical axis AX in order from the object side, a first lens group G1, a second lens group G2, and a third lens group G3. The first lens group G1 comprises a positive meniscus lens L11 having a concave surface oriented toward the object side and a positive meniscus lens L12 having a concave surface oriented toward the object side. The second lens group G2 comprises a biconvex lens L21; a cemented positive lens L22 including a biconcave lens cemented to a biconvex lens; and a cemented positive lens L23 including a negative meniscus lens L2a having a convex surface oriented toward the object side, a biconvex lens L2b, and a biconcave lens L2c. The third lens group G3 comprises a cemented negative lens L31 including a biconvex lens cemented to a biconcave lens.

Specifications pertaining to Example Embodiment 2 are provided below in Table 3. In Table 3, F denotes the focal length of the microscope objective lens, NA represents the numerical aperture, β represents the magnification exhibited by a combination of the subject microscope objective lens and the imaging lens of FIG. 5, and WD represents the working distance. In addition, the left-hand column provides lens-surface numbers in order from the object side, the second column labeled "r" provides data on the corresponding curvature radius (mm) for each lens surface, the third column labeled "d" provides data on the corresponding axial distance (mm) between adjacent lens surfaces, and the fourth and fifth columns labeled "n" and "ν", respectively, pertain to the refractive index and Abbe number, respectively, (relative to the D-line ($\lambda$=587.6 nm) for each corresponding lens.

TABLE 3

F = 10 mm
NA = 0.75
β = −20.0
WD = 1.24 mm
$f_{11}$ = 203 mm
$f_2$ = 38 mm
$f_3$ = 4395 mm

| Surface No. | r (mm) | d (mm) | ν | n |
|---|---|---|---|---|
| 1 | −4.7705 | 8.9500 | 53.74 | 1.69350 |
| 2 | −8.7301 | 0.1500 | | |
| 3 | −36.9110 | 5.4000 | 82.51 | 1.49782 |
| 4 | −13.1300 | 0.3000 | | |
| 5 | 129.2880 | 3.5000 | 82.51 | 1.49782 |
| 6 | −25.6660 | 0.1500 | | |
| 7 | −60.9200 | 1.2000 | 38.79 | 1.67162 |
| 8 | 21.8002 | 7.0000 | 95.56 | 1.43388 |
| 9 | −19.6043 | 0.1500 | | |
| 10 | 26.4090 | 1.7000 | 38.79 | 1.67162 |
| 11 | 15.2012 | 7.0000 | 95.56 | 1.43388 |
| 12 | −31.8800 | 1.4000 | 51.35 | 1.52682 |
| 13 | 79.4290 | 16.1000 | | |
| 14 | 25.7030 | 5.1500 | 37.90 | 1.72342 |
| 15 | −30.0360 | 2.1000 | 51.35 | 1.52682 |
| 16 | 13.3198 | | | |
| Values of Conditional Expressions | | | | |
| (1) | |F/f11| + |F/f3| | = | 0.05 | |
| (2) | f2/F | = | 3.7 | |
| (3) | |F/r7| | = | 0.5 | |
| (4) | $n_{2a} - n_{2b}$ | = | 0.23774 | |
| (5) | $n_{2c} - n_{2b}$ | = | 0.09294 | |

FIGS. 4A–4D provide aberration plots for this Example Embodiment. In each plot, Y denotes the image height, D denotes the D-line ($\lambda$=587.6 nm), C denotes the C-line ($\lambda$=656.3 nm), F denotes the F-line ($\lambda$=486.1 nm), and G denotes the G-line ($\lambda$=435.6 nm). In FIG. 4B, the solid line indicates the sagittal image plane and the dashed line indicates the meridional image plane.

As is clear from the various aberration plots, all of the aberrations are effectively corrected.

With this invention, as described above, a plan apochromatic microscope objective lens can be realized with a small number of constituent lens elements. The objective lens exhibits a magnification of approximately 20×, and a bright numerical aperture of approximately 0.75. Moreover, the objective lens exhibits superior contrast and resolution across an image plane that is extremely flat across the entire visual field. Finally, the objective lens exhibits a relatively long working distance.

Whereas the invention has been described with reference to preferred and example embodiments, it will be understood that the invention is not limited to those embodiments. On the contrary, the invention is intended to encompass all alternatives, modifications, and equivalents as may be included within the spirit and scope of the invention as defined by the appended claims.

What is claimed is:

1. A microscope objective lens, comprising, on an optical axis in order from the object side:

(a) a first lens group G1 comprising a meniscus lens L11 having a focal length f11 and a concave surface oriented toward the object side, and a positive meniscus lens L12 having a concave surface oriented toward the object side;

(b) a second lens group G2 having a focal length f2 and comprising a simple lens L21, a cemented lens L22 including a negative lens cemented to a positive lens and having an imagewise surface with curvature radius r7, and a cemented lens L23 including a positive lens cemented to two negative lenses;

(c) a third lens group G3 having a focal length f3 and comprising a cemented lens L31 having an overall weak refractive power including a positive lens cemented to a negative lens; and (d) the objective lens having an overall focal length F and satisfying the conditions:

$|F/f11|+|F/f3|<0.1$ $3<f2/F<5$ $|F/r7|<0.7$

2. The microscope objective lens of claim 1, wherein the cemented lens L23 in the second lens group G2 comprises, in order from the object side, a negative lens L2a cemented to a positive lens L2b which is cemented to a negative lens L2c, the objective lens further satisfying the conditions:

$0.1<n_{2a}-n_{2b}$ $0.08<n_{2c}-n_{2b}$ wherein $n_{2a}$ is the refractive index (relative to D-line) of the negative lens L2a, $n_{2b}$ is the refractive index (relative to D-line) of the positive lens L2b, and $n_{2c}$ is the refractive index (relative to D-line) of the negative lens L2c.

* * * * *

UNITED STATES PATENT AND TRADEMARK OFFICE
CERTIFICATE OF CORRECTION

PATENT NO.    : 5,729,391

DATED         : March 17, 1998

INVENTOR(S)   : ITOE ITO

It is certified that error appears in the above-identified patent and that said Letters Patent is hereby corrected as shown below:

Column 2, line 62, Conditional Expression (2) should be -- $3 < f2/F < 5$ --.

Signed and Sealed this

Thirteenth Day of October 1998

*Attest:*

BRUCE LEHMAN

*Attesting Officer*          *Commissioner of Patents and Trademarks*